(12) United States Patent
Jiang et al.

(10) Patent No.: US 8,705,978 B2
(45) Date of Patent: Apr. 22, 2014

(54) METHOD OF EFFICIENTLY AND SAFELY ADDING AND DELETING CHANNELS IN AN AMPLIFIED WAVELENGTH DIVISION MULTIPLEXING SYSTEM

(75) Inventors: Zhiping Jiang, Kanata (CA); Jian Zhong, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 204 days.

(21) Appl. No.: 13/164,226

(22) Filed: Jun. 20, 2011

(65) Prior Publication Data

US 2012/0321319 A1    Dec. 20, 2012

(51) Int. Cl.
*H04B 10/00*    (2013.01)
(52) U.S. Cl.
USPC ............... 398/173; 398/181; 398/37; 398/83
(58) Field of Classification Search
USPC .................................................. 398/173–181
See application file for complete search history.

(56) References Cited

U.S. PATENT DOCUMENTS

| | | | | |
|---|---|---|---|---|
| 5,506,724 A | * | 4/1996 | Shimizu et al. | 359/341.41 |
| 5,907,420 A | * | 5/1999 | Chraplyvy et al. | 398/180 |
| 6,091,869 A | | 7/2000 | Sundelin | |
| 6,252,699 B1 | * | 6/2001 | Kohn | 359/337 |
| 6,392,769 B1 | | 5/2002 | Ford et al. | |
| 6,452,703 B1 | | 9/2002 | Kim et al. | |
| 6,563,614 B1 | * | 5/2003 | Stephens et al. | 398/5 |
| 6,671,085 B2 | | 12/2003 | So et al. | |
| 6,894,832 B1 | * | 5/2005 | Aweya et al. | 359/341.41 |
| 6,944,399 B2 | * | 9/2005 | Yu et al. | 398/5 |
| 6,965,470 B2 | | 11/2005 | So | |
| 7,616,848 B2 | * | 11/2009 | Takeyama et al. | 385/24 |
| 7,813,642 B2 | * | 10/2010 | Muro et al. | 398/95 |
| 7,826,748 B2 | * | 11/2010 | Yang et al. | 398/83 |
| 7,903,978 B2 | * | 3/2011 | Stephens et al. | 398/160 |
| 2002/0021861 A1 | * | 2/2002 | Gnauck et al. | 385/24 |
| 2003/0081893 A1 | | 5/2003 | Wing So | |
| 2004/0131353 A1 | * | 7/2004 | Cannon et al. | 398/1 |
| 2005/0031343 A1 | * | 2/2005 | Stephens et al. | 398/33 |
| 2005/0152693 A1 | * | 7/2005 | Grand et al. | 398/27 |

(Continued)

FOREIGN PATENT DOCUMENTS

| | | |
|---|---|---|
| CA | 2371686 A1 | 11/2000 |
| CN | 1250282 A | 4/2000 |
| CN | 1623292 A | 6/2005 |

OTHER PUBLICATIONS

Foreign Communications From a Counterpart Application, PCT Application PCT/CN2012/077195, International Search Report and Written Opinion dated Nov. 22, 2012, 12 pages.

*Primary Examiner* — Agustin Bello
(74) *Attorney, Agent, or Firm* — Conley Rose, P.C.; Grant Rodolph; Jonathan K. Polk

(57) ABSTRACT

An apparatus comprising one or more optical amplifiers coupled to an optical link and configured to amplify a plurality of Wavelength Division Multiplexing (WDM) channels that are transmitted at a plurality of wavelengths on the optical link, and a processor coupled to the optical link and configured to add, delete, or both a plurality of WDM channels in the optical link based on an allowed power ratio indication for the WDM channels, wherein the allowed power ratio indication is calculated based on a plurality of gain change representations for the WDM channels at a plurality of power ratios and on a link budget requirement for the optical link.

20 Claims, 12 Drawing Sheets

(56) References Cited

U.S. PATENT DOCUMENTS

| | | | |
|---|---|---|---|
| 2006/0024057 A1* | 2/2006 | Kilper et al. ................... 398/69 |
| 2007/0086779 A1* | 4/2007 | Stephens et al. ............... 398/33 |
| 2007/0274725 A1* | 11/2007 | Takeyama et al. ............. 398/93 |
| 2008/0080865 A1* | 4/2008 | Muro et al. ..................... 398/83 |
| 2008/0253764 A1* | 10/2008 | Collings et al. ................ 398/37 |
| 2009/0059354 A1* | 3/2009 | Kilper et al. ............. 359/341.41 |
| 2009/0116837 A1* | 5/2009 | Boertjes et al. ................ 398/58 |
| 2009/0116842 A1* | 5/2009 | Stango et al. .................. 398/83 |
| 2009/0297143 A1* | 12/2009 | Takeyama et al. .............. 398/34 |
| 2009/0324229 A1* | 12/2009 | Uda et al. ....................... 398/79 |
| 2010/0239263 A1* | 9/2010 | Tokura et al. .................. 398/94 |
| 2010/0296818 A1* | 11/2010 | Zhou et al. ................... 398/147 |
| 2011/0026928 A1* | 2/2011 | Stango et al. .................. 398/83 |
| 2011/0064412 A1 | 3/2011 | Claringburn et al. |
| 2011/0103793 A1* | 5/2011 | Collings et al. ................ 398/37 |
| 2011/0211836 A1* | 9/2011 | Leclair et al. .................. 398/65 |
| 2011/0211841 A1* | 9/2011 | Leclair et al. ................ 398/140 |
| 2012/0321319 A1* | 12/2012 | Jiang et al. ..................... 398/79 |

* cited by examiner

FIG. 9

METHOD OF EFFICIENTLY AND SAFELY ADDING AND DELETING CHANNELS IN AN AMPLIFIED WAVELENGTH DIVISION MULTIPLEXING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In an amplified optical communication link, such as an Erbium Doped Fiber Amplifier (EDFA) amplified Dense Wavelength Division Multiplexing (DWDM) optical link, the action of adding and/or deleting channels can cause power disturbance on the existing or remaining channels. This power disturbance may lead to system performance degradation, for example as Optical Signal-to-Noise Ratio (OSNR) degradation and/or nonlinear effects in optical fibers, and receiver power change. To limit the size or extent of this power disturbance, the number of channels that are added and/or deleted at once (in one step) is relatively small, usually one channel at a time. Further, in the case of adding a channel, the channel power is not brought up to its final target power level in one step. Instead, the channel power is brought to a level that is several decibels (dBs) below its final target, and then adjusted to the target in subsequent optimization steps. Sometimes the bit error ratios (BER) of all the in-service channels are monitored to avoid substantial drop in performance. Such measures make the channel add/delete operation substantially time consuming. For example, it may take several hours to add/delete a relatively large number of channels, which may not be feasible.

SUMMARY

In one embodiment, the disclosure includes an apparatus comprising one or more optical amplifiers coupled to an optical link and configured to amplify a plurality of Wavelength Division Multiplexing (WDM) channels that are transmitted at a plurality of wavelengths on the optical link, and a processor coupled to the optical link and configured to add, delete, or both a plurality of WDM channels in the optical link based on an allowed power ratio indication for the WDM channels, wherein the allowed power ratio indication is calculated based on a plurality of gain change representations for the WDM channels at a plurality of power ratios and on a link budget requirement for the optical link.

In another embodiment, the disclosure includes a network component comprising a transmitter configured to transmit a plurality of in-service (IS) wavelength channels on an optical link; and a processor configured to at least one of add channels and delete a plurality of add/delete channels on the optical link based on a plurality of gain change representations for a plurality of power ratios of the add/delete channels versus the IS channels to satisfy a link budget requirement.

In yet another embodiment, the disclosure includes a method comprising calculating a plurality of gain change representations at different power ratios for a set of first channels and second channels, calculating an allowed power ratio indication based on the gain change representations and a link budget requirement, and determining an allowed number of channels that can be added or deleted to an optical communication system based on the allowed power ratio indication.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 is a schematic diagram of an embodiment of a channel add scenario.

DETAILED DESCRIPTION

Figure 1:
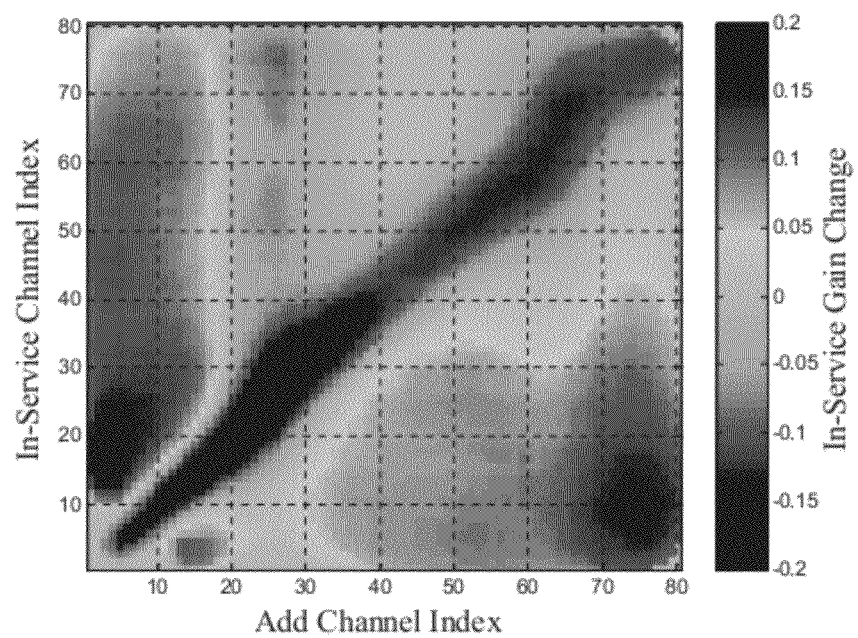
FIG. 1 is a chart of an embodiment of a sensitivity map.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The interaction between a plurality of channels in an optical link, e.g., a DWDM optical link, may be subject to optical (e.g., EDFA) amplification, which may often be operated in a constant gain mode. The gain at different wavelengths (for different channels) may vary due to the amplifier's characteristic static gain ripple across the wavelengths and a dynamic spectral hole burning (SHB) effect. When channels are added/deleted, the gain of the existing/remaining channels may undergo change since the quantity of channels may change and the amplifier may keep the average gain for all the channels at about a constant level. An optical link may comprise a substantially large number of optical amplifiers (e.g., EDFAs) in series. Thus, a relatively small gain change in one amplifier may cascade through several amplifiers to a substantially larger amount, which may lead to significant performance degradation.

It may be possible to characterize the static gain ripple, which may include a gain tilt, for a plurality of amplified channels. However, the SHB effect for the amplified channels is a dynamic effect that may have a substantially complex impact on the channel gain coupling during channel adding/deleting. Currently, there is no practical model that is accurate enough to predict such dynamic gain change in a DWDM system. Due to the substantially large quantity of channels in a DWDM system, the number of possible channel combinations may be substantially large, and thus characterizing the dynamic gain change for all possible scenarios (e.g., possible channel combinations) of interest may not be practical.

Channel adding/deleting may be inefficient due to a lack in understanding and a difficulty of characterizing EDFA gain dynamics. To achieve efficient channel adding/deleting, the system performance degradation has to be within an allocated tolerance margin for relatively sensitive scenarios. Attempts have been made to divide the scenarios and identify the relatively sensitive scenarios based on perturbation sensitivity analysis. However, it may be substantially difficult to examine all possible cases or scenarios using such approach.

Disclosed herein is a system and method for efficiently and safely adding/deleting channels in an optical link in an amplified optical system, such as a DWDM system. The method may implement an algorithm that, within the link budget allowance (also referred to as link budget requirement), selects and maximizes (or increases) the number of channels to be added/deleted in each step. The link budget allowance specifies a maximum allowed (or tolerated) noise to power ratio for a link. The method may be repeated in a plurality of steps to achieve a desired number of channels. The channel selection algorithm for both the number of channels and the channels' wavelengths may be based on a sensitivity map. The sensitivity map may be a matrix that provides a measure of the impact of adding (or deleting) a channel at a corresponding wavelength on the existing channels. The sensitivity map may be a two dimensional sensitivity map that may describe the system sensitivity to channel adding/deleting. The sensitivity map may also be converted into a matrix that determines the allowed channel number ratio for channel adding/deleting, as described below.

FIG. 1 illustrates an embodiment of a sensitivity map 100, which may measure the impact of adding a channel on an existing channel in terms of gain. The sensitivity map may represent a gain change for the existing channel when a second channel is added, and thus may characterize the gain impact in a 1+1 channel addition scenario (add one channel to one IS channel), e.g., in an EDFA amplified DWDM system. The sensitivity map 100 may be represented by a two dimensional function $\Delta G(P_{\lambda 1}, P_{\lambda 2})$. The function $\Delta G(P_{\lambda 1}, P_{\lambda 2})$ may indicate a gain change of an IS (existing) channel $\lambda 1$ when another channel $\lambda 2$ is added/deleted. $P_{\lambda 1}$ and $P_{\lambda 2}$ may be the channel power levels for $\lambda 1$ and $\lambda 2$, respectively. In different embodiments, the sensitivity map that represents the gain change for the channels may be a visual map, a table of data, or any other representation of the gain change information, which may be stored, displayed, and/or printed.

FIG. 1 shows an exemplary sensitivity map 100 in an about 80 channel system. The horizontal axis comprises the added channel (or add channel) index and the vertical axis comprises the IS channel index. The color shading indicates the IS channel gain change in dB caused by the addition of the add channel. For instance, the darker regions on the map reveal a greater gain change (positive or negative gain change) for the IS channel (that corresponds to the IS channel index) when the second channel (that corresponds to the add channel index) is added.

The sensitivity map 100 may be obtained for an amplifier or EDFA in the system and may depend on the design and operating condition of the EDFA, such as gain and gain tilt. Currently, there is no theoretical model that may be accurate enough in predicting a gain change of an existing channel caused by the addition of another channel. Thus, measurements (e.g., lab measurements) of the sensitivity map 100 may be needed to obtain the sensitivity map 100 for the EDFA.

Figure 2:
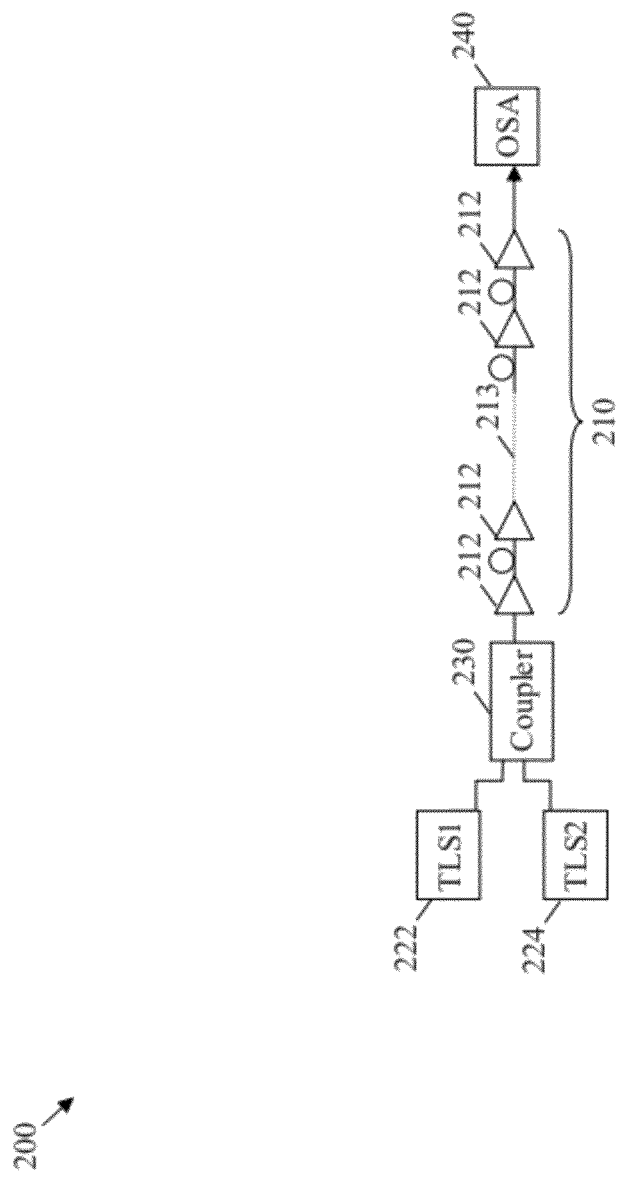
FIG. 2 is a schematic diagram of an embodiment of a sensitivity map measurement apparatus.

FIG. 2 illustrates an embodiment of a sensitivity map measurement apparatus 200 that may be used to obtain the measurements values for a sensitivity map of a type of optical amplifiers (e.g., a type of EDFA), such as the sensitivity map 100. The sensitivity map measurement apparatus 200 may comprise optical link components 210 that are to be tested to obtain the sensitivity map for a type of optical amplifiers, e.g. EDFAs. The sensitivity map measurement apparatus 200 may also comprise a first tunable laser source (TLS1) 222, a second tunable laser source (TLS2) 224, an optical coupler 230, and an optical spectrum analyzer (OSA) 240. The components of the sensitivity map measurement apparatus 200 may be arranged as shown in FIG. 2.

The optical link components 210 may comprise one or more optical amplifiers 212, such as a plurality of EDFAs, that are coupled to one another in series along an optical fiber 213 that extends from the optical coupler 230 to the OSA 240. The optical amplifiers 212 may be configured to introduce gain to the optical signal transmitted along the optical fiber 213 in a cascaded manner, such that the total gain at the output of the optical fiber 213 (at the OSA 240 side) may be about equal to the sum of gain of all the optical amplifiers 212. The optical amplifiers 212 may be substantially similar, e.g., substantially similar EDFAs, and the gain introduced by each optical amplifier 212 may be about the same. Thus, the total gain at the output of the optical fiber 213 may be about equal to the product of the number of optical amplifiers 212, N, in the optical link components 210 and the average gain per one optical amplifier 212, e.g., N×gain, where N is an integer.

The TLS1 222 and TLS2 224 may be tunable laser sources that are configured to output light at a tunable wavelength, such as over a range of wavelengths determined by design. The TLS1 222 and TLS2 224 may be any tunable laser sources such as tunable laser diodes, Sample Grating Distributed Bragg Reflector (SG-DBR) lasers, external cavity lasers using a Micro-electromechanical systems (MEMS) structure for tuning the cavity length, thermal tuned Distributed Feedback (DFB) lasers, tunable Vertical Cavity Surface Emitting Laser (VCSELs), and/or other tunable laser technologies. The TLS1 222 and TLS2 224 may provide a first channel wavelength that may correspond to the IS channel and a second channel wavelength that may correspond to the add channel, respectively. The optical coupler 230 may be configured to combine the light output from the TLS1 222 and TLS2 224 into a single light output (in the fiber 213) that comprise the first wavelength of the first channel and the second wavelength of the second channel. The OSA 240 may be configured to measure the power spectrum of the light output from the fiber 213.

The TSL1 222 output may be fixed at a first wavelength, $\lambda 1$, for the first channel while the TSL2 224 output may be tuned to vary a second wavelength, λ2, for the second channel until each of a plurality of second wavelength values λ2 may be combined individually with the same fixed first wavelength value λ1 of the first channel. The fixed first wavelength may correspond to an IS channel index and the varied second wavelengths may correspond to the add channel indices in the sensitivity map. Thus, the measurements obtained for the fixed first wavelength value and the varied second wavelength values may correspond to a row (or column) in the sensitivity map. To obtain a plurality of (λ1,λ2), two power spectra may be measured by the OSA 240: one value with TLS2 224 rows (or columns) in the sensitivity map, the TSL1 222 may be tuned and fixed to another first wavelength for another first channel that corresponds to another first channel and the second wavelength may be varied similarly. For each wavelength combination on, and another value with TLS2 224 off. The power difference in dB of these two spectra at λ1 is calculated. The power difference between the two values may then be divided by the number of EDFAs, N, to obtain a measurement value or a data point in the sensitivity map at (λ1,λ2).

To increase the accuracy of the measurements above, multiple optical amplifiers 212 or EDFAs may be cascaded in the optical link components 210. For instance, if N EDFAs are cascaded, the measurement accuracy may be increased by a factor of about N, since the gain changes are substantially coherent among the EDFAs. Although cascading multiple EDFAs may also average out the random gain ripple in the optical link of the sensitivity map measurement apparatus 200, this averaging may also occur in real deployed systems. Thus the measurements obtained may not be substantially different from the measurements in real deployed systems.

Figure 3:
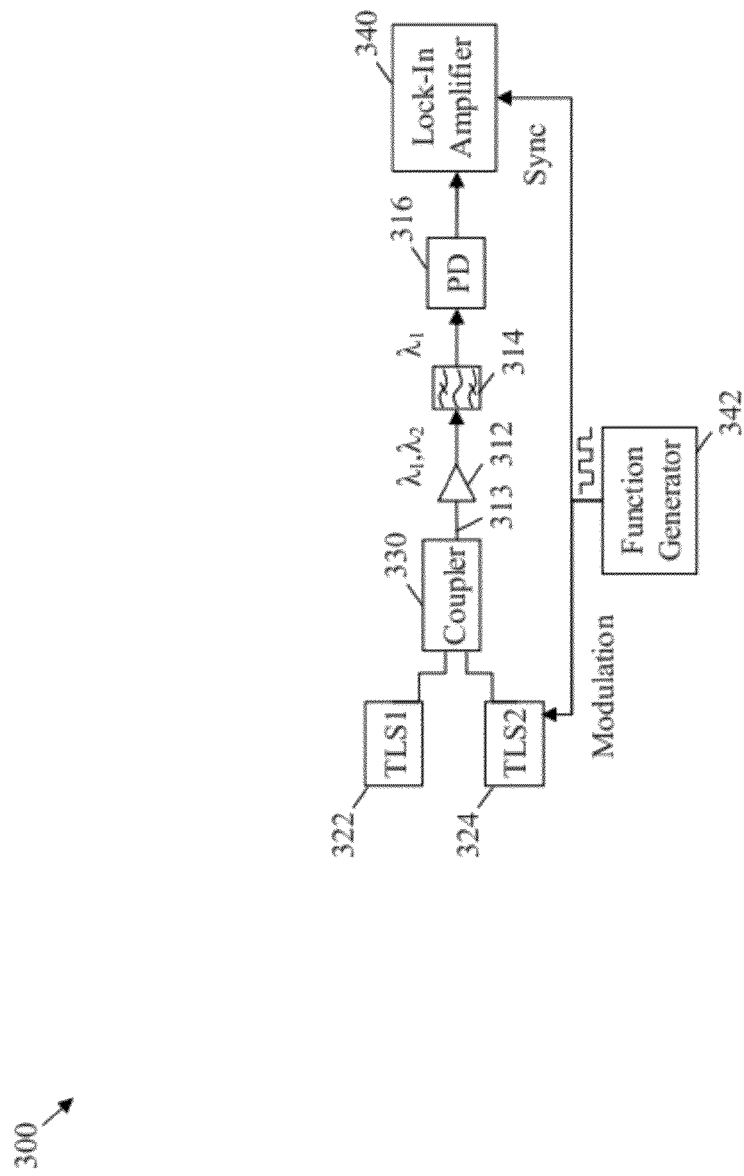
FIG. 3 is a schematic diagram of another embodiment of a sensitivity map measurement apparatus.

FIG. 3 illustrates another embodiment of a sensitivity map measurement apparatus 300 that may be used to obtain the measurements values for a sensitivity map of an optical amplifier (e.g., an EDFA), such as the sensitivity map 100. The sensitivity map measurement apparatus 300 may comprise an optical amplifier 312, e.g. an EDFA, coupled to an optical fiber 313. The sensitivity map measurement apparatus 300 may also comprise a TLS1 322, a TLS2 324, an optical coupler 330, an optical tunable filter 314, a photodetector (PD) 316, a lock-in amplifier 340, and a function generator 342. The components of the sensitivity map measurement apparatus 300 may be arranged as shown in FIG. 3.

The optical amplifier 312, TSL1 322, and TSL2 324 may be configured similar to the optical amplifier 212, TSL1 222, and TSL2 224, respectively. However, only one optical amplifier 312 or EDFA may be used in the sensitivity map measurement apparatus 300. The sensitivity map measurement apparatus 300 may be more sensitive than the sensitivity map measurement apparatus 200 and may provide more accurate measurements for the single EDFA. Specifically, the optical tunable filter 314 may pass only the first wavelength λ1 of the first channel without the second wavelength λ2 of the second channel. The first wavelength may be used to synchronize the modulation of the second channel with the first channel and thus improve detection sensitivity, as described below.

The first wavelength may be passed through the optical tunable filter 314 after measuring the power spectrum of the light output from the fiber 313 that comprises both the first and second wavelengths. The power spectrum of the combined first and second wavelengths or first and second channels may be measured using an OSA (not shown), which may be similar to the OSA 240 and positioned between the optical amplifier 312 and the optical tunable filter 314. The PD 316 may then convert the optical signal of the first channel wavelength at the output of the optical tunable filter 314 into an electric signal, which may then be forwarded to the lock-in amplifier 340. The lock-in amplifier 340 may detect the first wavelength and may be synchronized (e.g., electrically) with the function generator 342, which may thus modulate the output of the TSL2 324 based on the detected first wavelength. As such, the second wavelength λ2 may be modulated substantially in sync with the modulation of the first wavelength λ1.

Using the lock-in detection scheme above to modulate the TSL2 234 in sync with TSL1 322 may substantially increase the detection sensitivity in the sensitivity map measurement apparatus 300 and enable performing measurements for a single optical amplifier 312 in the optical link. The increased detection sensitivity may also enable detecting measurement differences and different sensitivity maps for different EDFAs, which may be used or inserted in the sensitivity map measurement apparatus 300 interchangeably. The measurements may also be obtained faster since the lock-in amplifier 340 output reflects the modulation of the second wavelength on the first wavelengths. However, system or component calibration may be needed to obtain the absolute change.

The selection of the modulation frequency for the first and second wavelengths or channels may be critical. The modulation may be substantially slower than the EDFA gain control loop (between the lock-in amplifier 340 and the TSL2 324) to allow the gain control to stabilize. The response speed of the gain control loop may be on the order of multiple tens of microseconds. The slower modulation may require a larger lock-in time constant, which may slow down measurements. For instance, a modulation frequency at about few (e.g., less than about ten or about five) hundred hertz and a lock-in time constant of about a few hundred million seconds may be used.

As described above, the sensitivity map may be obtained when adding one channel to a system that already has one channel, or deleting one channel from a system that has two channels initially. Typically, this is not the case for most systems, where multiple channels may be added or deleted. Thus, a scheme may be needed to handle the case of adding/deleting an arbitrary number of channels to/from an arbitrary number of channels in the system. The scheme may be based on the simpler case of adding two channels to an existing channel in the system.

Figure 4:
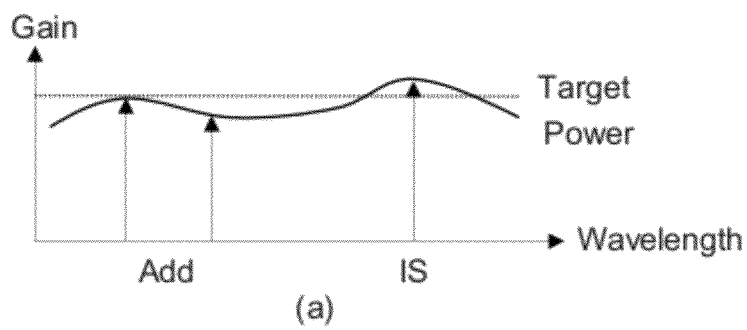
FIG. 4 is a chart of an embodiment of a two-channel add scenario.
Figure 4:
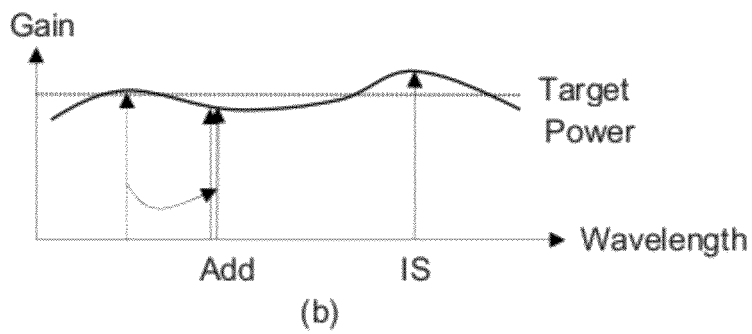
Figure 4:
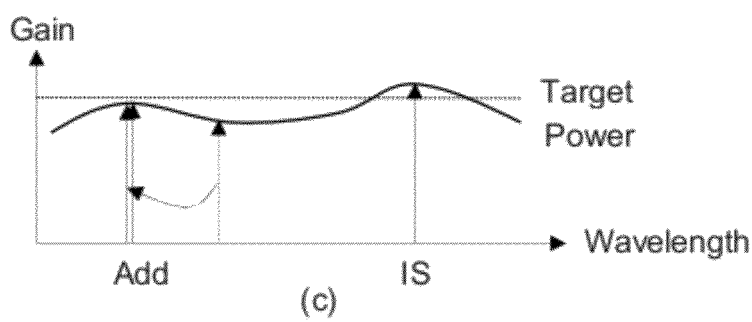

FIG. 4 illustrates an embodiment of a two-channel add scenario 400, which may be used to develop a scheme for adding/deleting an arbitrary number of channels. Graph (a) shows two channels that are added to a system with one IS channel. A gain curve is also shown and indicates that the two add channels have lower gain than the IS channel. Thus, to maintain an average target gain, the power of the IS channel may be pushed up. This explains the gain coupling during channel adding. Graph (b) shows the case where two channels are added at the same wavelength of the higher wavelength add channel (the right side add channel) and the corresponding change in the gain curve. The gain curve shows in this case more change and increase in the gain on the IS channel than in the case of graph (a). Graph (c) shows the case where two channels are added at the same wavelength of the lower wavelength add channel (the left side add channel) and the corresponding change in the gain curve. The gain curve shows in this case less change and increase in the gain on the IS channel than in the case of graph (a).

A three dimensional sensitivity map $\Delta G(P_{\lambda 1},P_{\lambda 2},P_{\lambda 3})$ for adding a second channel wavelength λ2 and a third channel wavelength λ3 to the IS channel wavelength λ1, may be related to the two dimensional sensitivity maps for adding individually λ2 to λ1 and λ3 to λ1 as follows:

$$\Delta G(P_{\lambda 1}, P_{\lambda 2}, P_{\lambda 3}) < \max\{\Delta G(P_{\lambda 1}, 2P_{\lambda 2}), \Delta G(P_{\lambda 1}, 2P_{\lambda 3})\}, \quad (1)$$

where $\Delta G(P_{\lambda 1}, 2P_{\lambda 2})$ and $\Delta G(P_{\lambda 1}, 2P_{\lambda 3})$ are the two dimensional sensitivity maps for adding λ2 to λ1 and for adding λ3 to λ1, respectively, and max{ } indicates the maximum value of the two. The factor 2 in each of $\Delta G(P_{\lambda 1}, 2P_{\lambda 2})$ and $\Delta G(P_{\lambda 1}, 2P_{\lambda 3})$ indicates twice the channel power for λ2 and λ3, respectively. According to inequality (1), replacing the value of $\Delta G(P_{\lambda 1}, P_{\lambda 2}, P_{\lambda 3})$ with $\max\{\Delta G(P_{\lambda 1}, 2P_{\lambda 2}), \Delta G(P_{\lambda 1}, 2P_{\lambda 3})\}$ may not provide exactly the same value but may guarantee a safe estimate of the gain change in λ1, e.g., to safely decide on whether to add the two channels λ2 and λ3.

Similarly, the case of adding λ3 to IS channels λ1 and λ2 may be evaluated using the following relation:

$$\Delta G((P_{\lambda 1}, P_{\lambda 2}), P_{\lambda 3}) < \max\{\Delta G(2P_{\lambda 1}, P_{\lambda 3}), \Delta G(2P_{\lambda 2}, P_{\lambda 3})\}, \quad (2)$$

In this case, the three dimensional sensitivity map $\Delta G((P_{\lambda 1}, P_{\lambda 2}), P_{\lambda 3})$ for adding λ3 to IS channels λ1 and λ2 may be safely replaced by the by $\max\{\Delta G(2P_{\lambda 1}, P_{\lambda 3}), \Delta G(2P_{\lambda 2}, P_{\lambda 3})\}$, where $\Delta G(2P_{\lambda 1}, P_{\lambda 3})$ is the two dimensional sensitivity map for adding λ3 to λ1 and $\Delta G(2P_{\lambda 2}, P_{\lambda 3})$ is the two dimensional sensitivity map for adding λ3 to λ2.

The same strategy above may be extended to the case or scenario of adding n channels to m, which may be represented by the relation:

$$\Delta G((P_{\lambda 1}, P_{\lambda 2}, \ldots, P_{\lambda m}), (P_{\lambda m+1}, P_{\lambda m+2}, \ldots, P_{\lambda m+n})) < \max\{\Delta G(mP_{\lambda \in (\lambda 1, \ldots, \lambda m)}, nP_{\lambda \in (\lambda m+1, \ldots, \lambda m+n)})\}, \quad (3)$$

where $\lambda \in (\lambda 1, \ldots, \lambda m)$ indicates that λ may be any possible wavelength among (λ1, ..., λm). Based on the inequality (3), the two dimensional sensitivity map may be used to simplify the more complicated (multi-dimensional) sensitivity map for adding n channels to m channels.

Thus, the complicated problem of finding the sensitivity map of adding n arbitrary channels to m arbitrary channels may be reduced to a simpler problem of adding one channel to one channel, which was described above. This may require converting the sensitivity map into an allowed power ratio map, as further described below. For an add/delete and IS channel combination, the power ratio of all the channels to be added over all the IS channels may be needed to determine the gain change. In the 1+1 channel case, the IS channel gain may be the target gain $G_t$ before adding the other channel. Since the amplifier maintains its target gain after a channel is added, the following relation may hold:

$$\frac{P_{ADD} G_{ADD} + P_{IS} G_{IS}}{P_{ADD} + P_{IS}} = G_t, \quad (4)$$

where $G_{ADD}$ and $G_{IS}$ are the gain at the add channel and the IS channel, respectively, and $P_{ADD}$ and $P_{IS}$ are the corresponding power levels at the input of the amplifier.

The above equation may be rearranged to obtain the IS channel gain change (e.g., in dB) that is caused by adding another channel, as follows:

$$\Delta G = 10 \log_{10} \frac{G_{IS}}{G_t} = 10 \log_{10} \frac{1+R}{1 + R \cdot \frac{G_{ADD}}{G_{IS}}}, \quad (5)$$

where $$R = \frac{P_{ADD}}{P_{IS}}$$

is the power ratio of the add channel relative to that of the IS channel.

Figure 5:
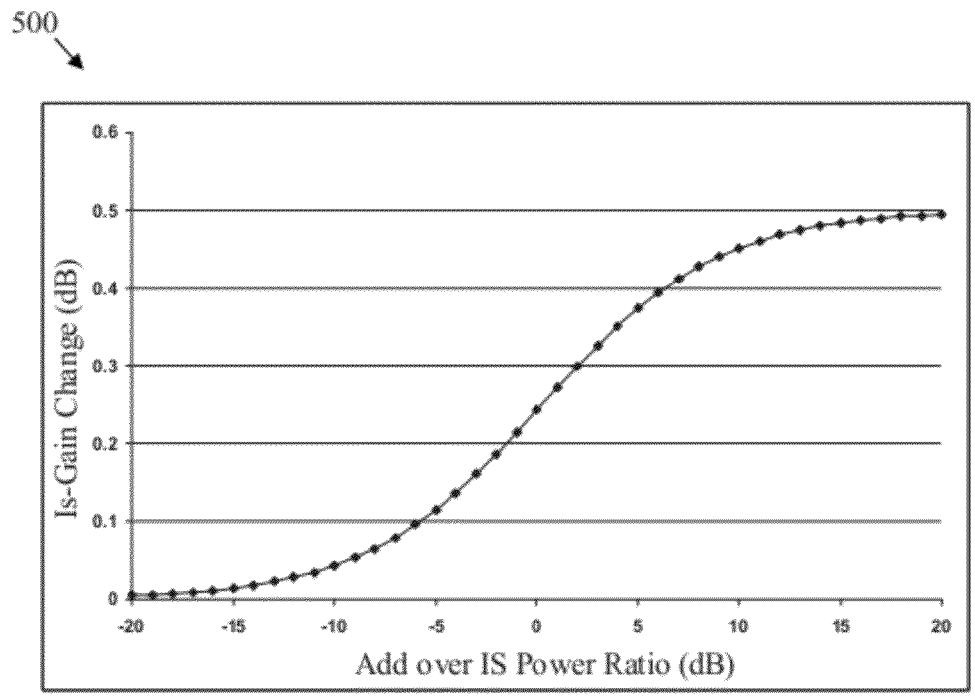
FIG. 5 is a chart of an embodiment of a channel gain versus add power ratio.

FIG. 5 illustrates an embodiment of a channel gain 500 versus add power ratio R. FIG. 5 shows an example where the add channel gain is about 0.5 dB lower than the IS channel gain. As shown, the IS channel gain change increases as the power ratio R increases. However this change caps out at about 0.5 dB, when the gain may become dominated by the add channel. In combination with the link budget requirement, e.g., in terms of allowed power levels, the sensitivity map may be converted into an allowed power ratio map $M_{APR}$ ($\lambda_{IS}, \lambda_{ADD}$), where $\lambda_{IS}$ is the IS channel wavelength and $\lambda_{ADD}$ is the add channel wavelength. This conversion may be achieved by measuring the sensitivity map at various add power to IS power ratios, and finding the power ratio that causes the highest amount of gain change allowed by link budget on the IS channel. Similar to the sensitivity map, the allowed power ratio map that represents the allowed power ratios for the channels may be a visual map, a table of data, or any other indication of the allowed power ratio information, which may be stored, displayed, and/or printed.

Figure 6:
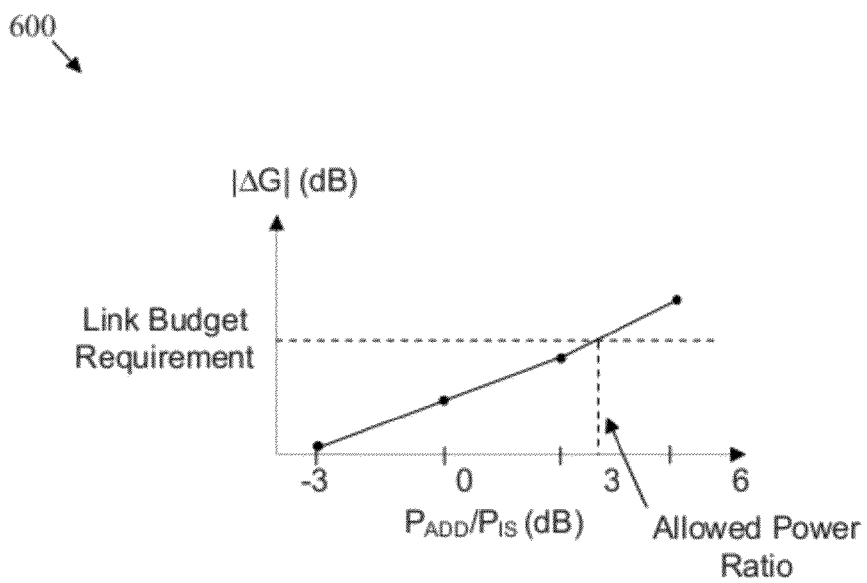
FIG. 6 is a chart of an embodiment of a channel gain change versus add-to-IS channel power ratio.

FIG. 6 illustrates an embodiment of a channel gain change 600 versus add-to-IS channel power ratio. For a given link budget requirement, the allowed add-to-IS channel power ratio is derived. The IS channel gain change may be measured at power ratios of about −3, about 0, about 3, and about 6 dB. The IS channel gain change may be measured as a function of the add over IS power ratio (on the x axis) and may be combined with the link budget requirement (on the y axis). As such, the maximum allowed power ratio in terms of the add over IS power ratio (or add power ratio) may be obtained. To simplify this operation, the sign of the gain change may be ignored and the absolute gain change may be used for estimating the allowed power ratio.

Figure 7:
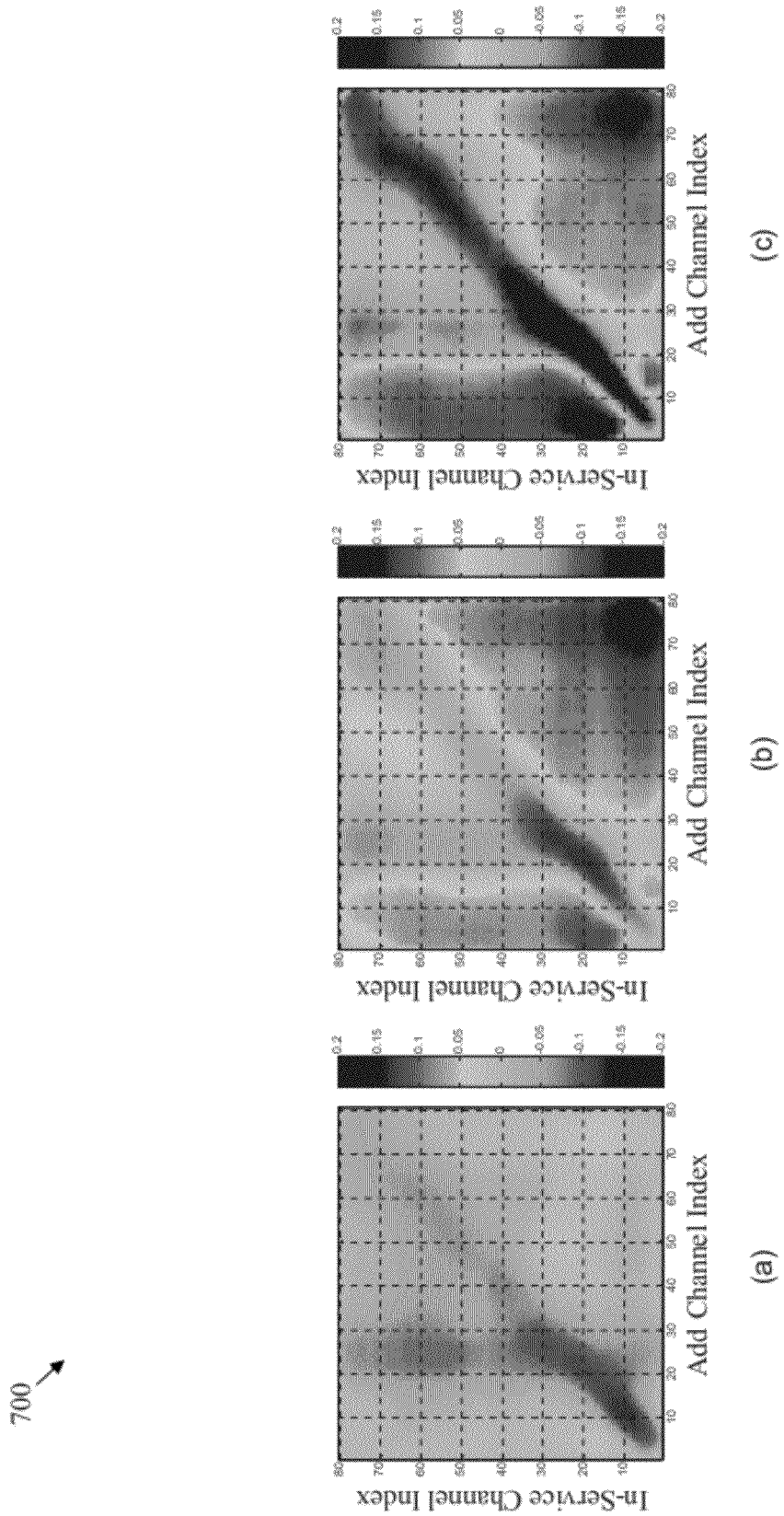
FIG. 7 is a chart of an embodiment of a plurality of sensitivity maps at different add power ratios.

FIG. 7 illustrates an embodiment of a plurality of sensitivity maps 700 at different add power ratios. The sensitivity maps shown are two dimensional sensitivity maps at different add power to IS power ratios. Graphs (a), (b), and (c) show the sensitivity maps with add/delete to IS channel power ratios (or R values) of about 1, about 2, and about 4. The same range of IS channel wavelengths and add channel wavelengths are used in the three sensitivity maps. The graphs reveal that adding the second channel at a higher power to the IS channel (at the same power) may cause larger gain change on the IS channel. This is shown by the darker regions in the sensitivity maps in the case of R=4 (graph (c)) in comparison to the cases of R=2 (graph (b)) and R=1 (graph (a)).

Figure 8:
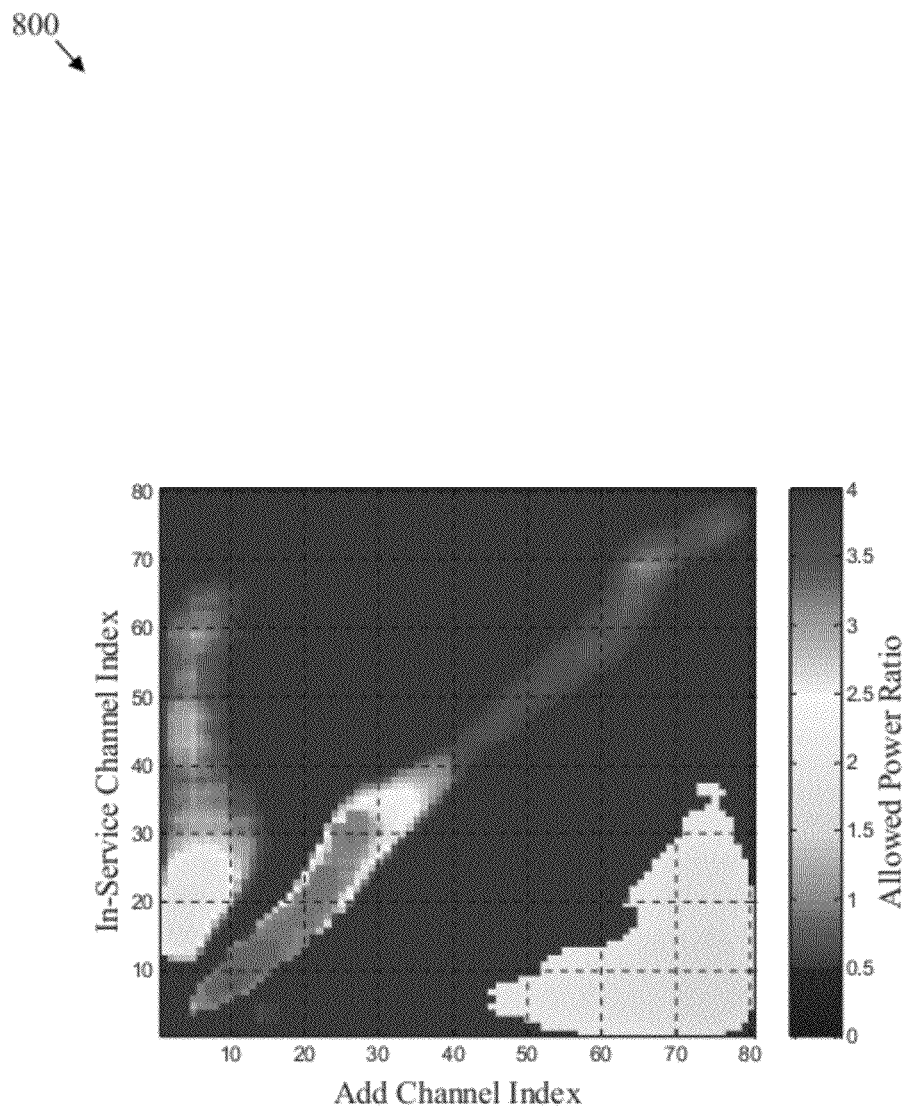
FIG. 8 is a chart of an embodiment of an allowed power ratio map.

FIG. 8 illustrates an embodiment of an allowed power ratio map 800 for a given link budget requirement, which may be obtained using a plurality of sensitivity maps. The allowed power ratio map 800 may be obtained by comparing a plurality of sensitivity maps for adding the same channel wavelength to the same IS channel at different power ratios (R values) and link budget information. The same scheme described in FIG. 6 may be used to obtain the power ratio based on the link budget requirement value for each data point in the allowed power ratio map 800. Each data point may correspond to each combination of IS channel and add channel. The scale bar on the right indicates the allowed power ratio in linear unit. The power ratio map 800 is clipped at a maximum allowed power ratio of about 4. Comparing the allowed power ratio map 800 to the sensitivity map 100 (in FIG. 1) reveals that the allowed power ratio may be higher in the less sensitive areas and may be lower in the more sensitive areas.

The allowed power ratio map 800 corresponds to a scenario where the link budget allowance is about 0.1 dB per amplifier (amp). Accordingly, the maximum allowed add power relative to the IS power ratio may be determined. This may guarantee that if the add power is below the value in the allowed power ratio map 800, then the gain change of the IS channel may be bounded by about 0.1 dB per amp. As such, if the 0.1 dB per amp value is budgeted for in the design, then any substantial performance hit may be avoided.

Using an allowed power ratio map, such as the allowed power ratio map 800, a channel addition/deletion algorithm may be implemented to increase or maximize the number of channels that may be added/deleted at each step. Specifically, the algorithm may add/delete the least sensitive channels first. After some channels are added/deleted, the system becomes less sensitive, and thus the remaining channels may be added/deleted faster, e.g., more channels may be added/deleted per one step. Further, more channels may be added in less sensitive areas and fewer channels may be added in more sensitive areas of the map. The algorithm may maximize the number of added/deleted channels efficiently based on the power ratio criterion, where for the same power ratio, more channels may be added as the number of IS channels increases.

For instance, the channel addition/deletion algorithm may be implemented using a pseudo code as follows:

```
// Step 1: calculate the allowed power ratio for each add channel
for each wavelength v in the add channel:
    get A(v,u) in the allowed ratio map for each wavelength u in the
    in-service channel
    calculate minA(v) = min{A(v,u)} for all u
    calculate R(v) = minA(v) * nIS         // allowed power ratio
                                              for add channel v
// Step 2: determine what channels can be added
Sort R in descending order to obtain Q
Select channels that satisfy Q(j)>=j       // allowed number of
                                              channels greater than
the number of selected channel
// Step 3: the channels selected in Step 2 are added and become
in-service channels, repeat Step 1 and 2 until all channels are
selected and added.
```

Figure 9:
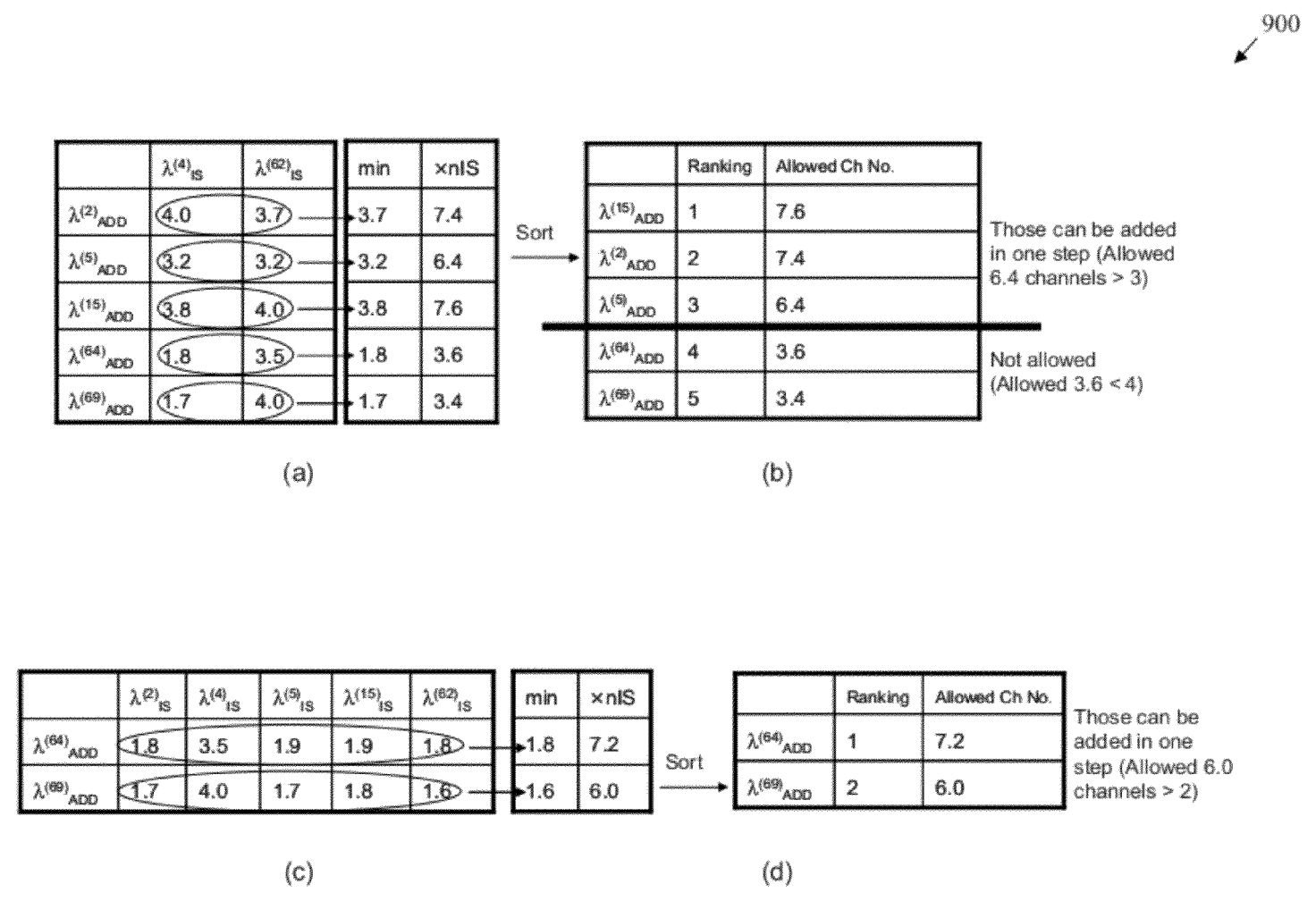

FIG. 9 illustrates an embodiment of a channel add scenario 900, which may use the allowed power ratio map. The channel add scenario 900 may use the allowed power ratio matrix or map $M_{APR}(\lambda_{IS},\lambda_{ADD})$ to select the add channels for each step. Initially, the system may comprise two IS channels, $\lambda^{(4)}_{IS}$ and $\lambda^{(62)}_{IS}$, and five add channels, $\lambda^{(2)}_{ADD}$, $\lambda^{(5)}_{ADD}$, $\lambda^{(15)}_{ADD}$, $\lambda^{(64)}_{ADD}$, and $\lambda^{(69)}_{ADD}$, as shown in table (a). The values in the table correspond to the values in $M_{APR}(\lambda_{IS}, \lambda_{ADD})$ for the corresponding channel combinations. As shown in the "min" column in table (a), the minimum allowed channel number ratio for each add channel or wavelength may be determined. Next, the minimum allowed channel number may be obtained for each minimum allowed channel number ratio, as shown in the "x nIS" column in table (a). The value nIS is equal to 2 since there are two IS channels in the system. Thus, the minimum allowed channel number ratio may be multiplied by 2 to obtain the minimum allowed channel number. In this scenario, all channel powers are assumed to be about equal, and thus the power ratio may be about the same as the channel number ratio.

The add channels in table (a) may then be sorted in descending order according to their minimum allowed channel numbers, as shown in the column "Ranking" in table (b). In table (b), a maximum of three add channels, $\lambda^{(15)}_{ADD}$, $\lambda^{(2)}_{ADD}$, and $\lambda^{(5)}_{ADD}$, may be added in one step, since the minimum allowed channel number for these three channels is 6.4 channels that corresponds to $\lambda^{(5)}_{ADD}$, which is greater than the quantity of the three add channels. However, the channel $\lambda^{(64)}_{ADD}$ may not be added along with the three channels above in the same step, since the minimum allowed channel number for these four channels is 3.6 channels that corresponds to $\lambda^{(64)}_{ADD}$, which is less than the quantity of the four add channels. Following the same logic, the remaining channel $\lambda^{(69)}_{ADD}$ may not be added either. When the channels $\lambda^{(15)}_{ADD}$, $\lambda^{(2)}_{ADD}$, and $\lambda^{(5)}_{ADD}$, are added, they become IS channels in addition to channels $\lambda^{(4)}_{IS}$ and $\lambda^{(62)}_{IS}$. The process may then be repeated as many steps as needed to add the remaining add channels. In this case, one additional step may be needed to add the remaining add channels $\lambda^{(64)}_{ADD}$ and $\lambda^{(69)}_{ADD}$, as shown in tables (c) and (d). The same logic may be implemented for deleting channels from an initial set of IS channels. In the case of deleting channels, the absolute values in the allowed power ratio matrix or map $M_{APR}(\lambda_{IS},\lambda_{ADD})$ may be used for the channel combinations.

Figure 10:
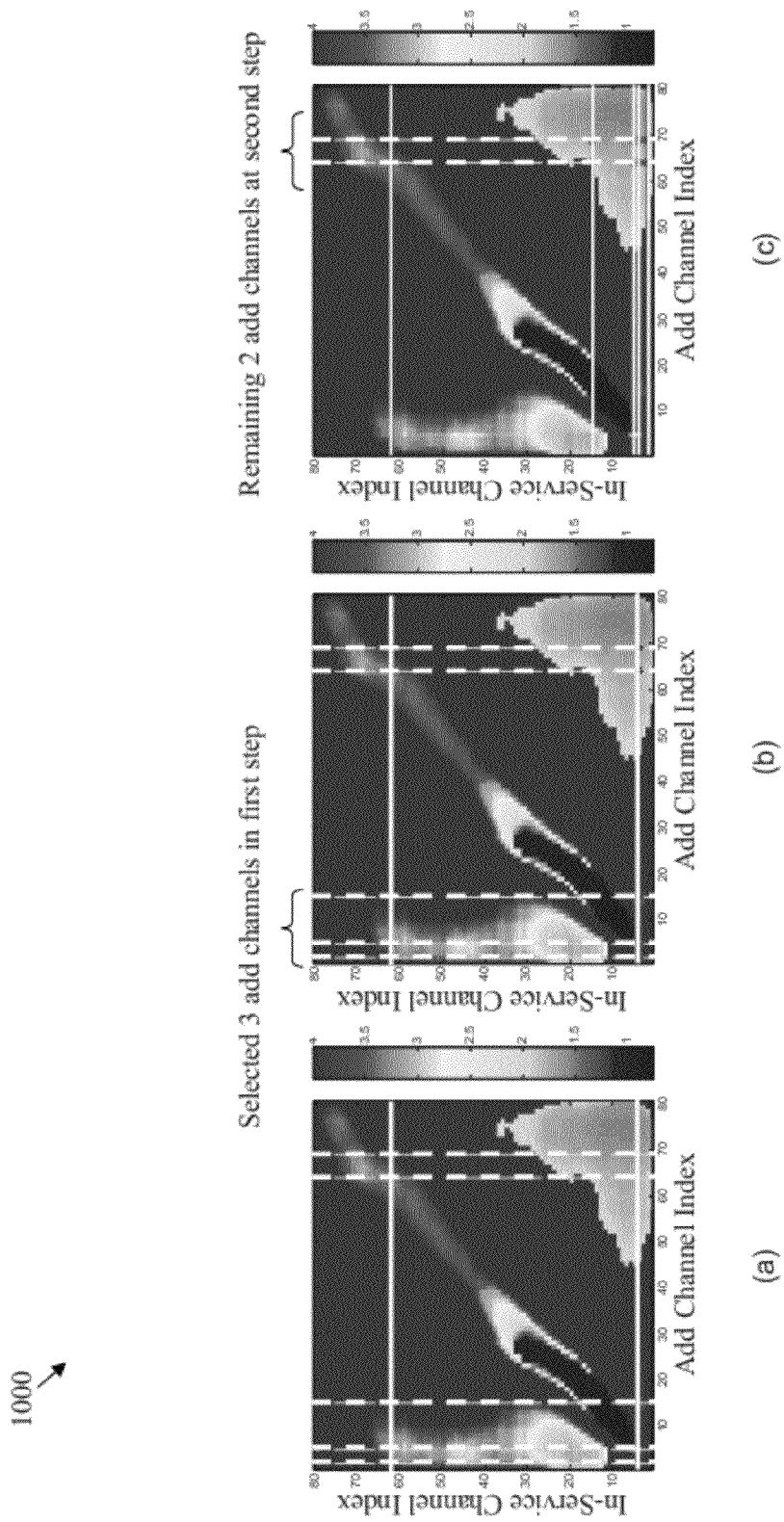
FIG. 10 is a chart of an embodiment of a plurality of allowed power ratio maps associated with FIG. 9.

FIG. 10 illustrates a plurality of allowed power ratio maps 1000 that correspond to the channel add scenario 900. Graph (a) shows the allowed power ratio map $M_{APR}(\lambda_{IS},\lambda_{ADD})$. The two horizontal lines indicate the two IS channels, $\lambda^{(4)}_{IS}$ and $\lambda^{(62)}_{IS}$, and the five vertical dashed lines indicate the five add channels $\lambda^{(2)}_{ADD}$, $\lambda^{(5)}_{ADD}$, $\lambda^{(15)}_{ADD}$, $\lambda^{(64)}_{ADD}$, and $\lambda^{(69)}_{ADD}$. Graph (b) shows the three add channels $\lambda^{(15)}_{ADD}$, $\lambda^{(2)}_{ADD}$, and $\lambda^{(5)}_{ADD}$, that are selected for adding in the first step, as described above. Graph (c) shows the IS channels after adding the three selected add channels in the first step. The resulting five IS channels $\lambda^{(4)}_{IS}$, $\lambda^{(62)}_{IS}$, $\lambda^{(15)}_{ADD}$, $\lambda^{(2)}_{ADD}$, and $\lambda^{(5)}_{ADD}$ are indicated by five corresponding horizontal solid lines. The remaining add channels $\lambda^{(64)}_{ADD}$ and $\lambda^{(69)}_{ADD}$, which may be added in the next step, are indicated by the two vertical dashed lines.

The channel selection or adding/deleting algorithm described above may be adaptive, since the algorithm may allow the least sensitivity channels to be added first and maximizes the number of channels that can be added in each step. These characteristics provide for an efficient implementation to add/delete channels in the system. Since the allowed channel number ratio map or matrix is derived based on the link budget allowance, the algorithm may also guarantee that the power disturbance caused by the channel(s) add/delete action is within the link budget requirement and thus is safe to implement without concern about performance hit. Further, using this algorithm may not require additional control measures, such as BER monitoring, which may consume more resources (e.g., cost and time).

In some embodiments that use different optical amplifiers, such as a mixed EDFA system, or that use the same type of amplifiers or EDFAs but with different operating conditions (such as different gain), the algorithm may be implemented based on one of two options. In a first option, the worst case sensitivity map among the different EDFAs may be used, e.g., if the efficiency of using the worst case map is sufficient to guarantee the safe adding/deleting of channels. In a second option, a sensitivity map may be used for each EDFA or gain level, which may be more cumbersome but also more efficient than the first option.

Figure 11:
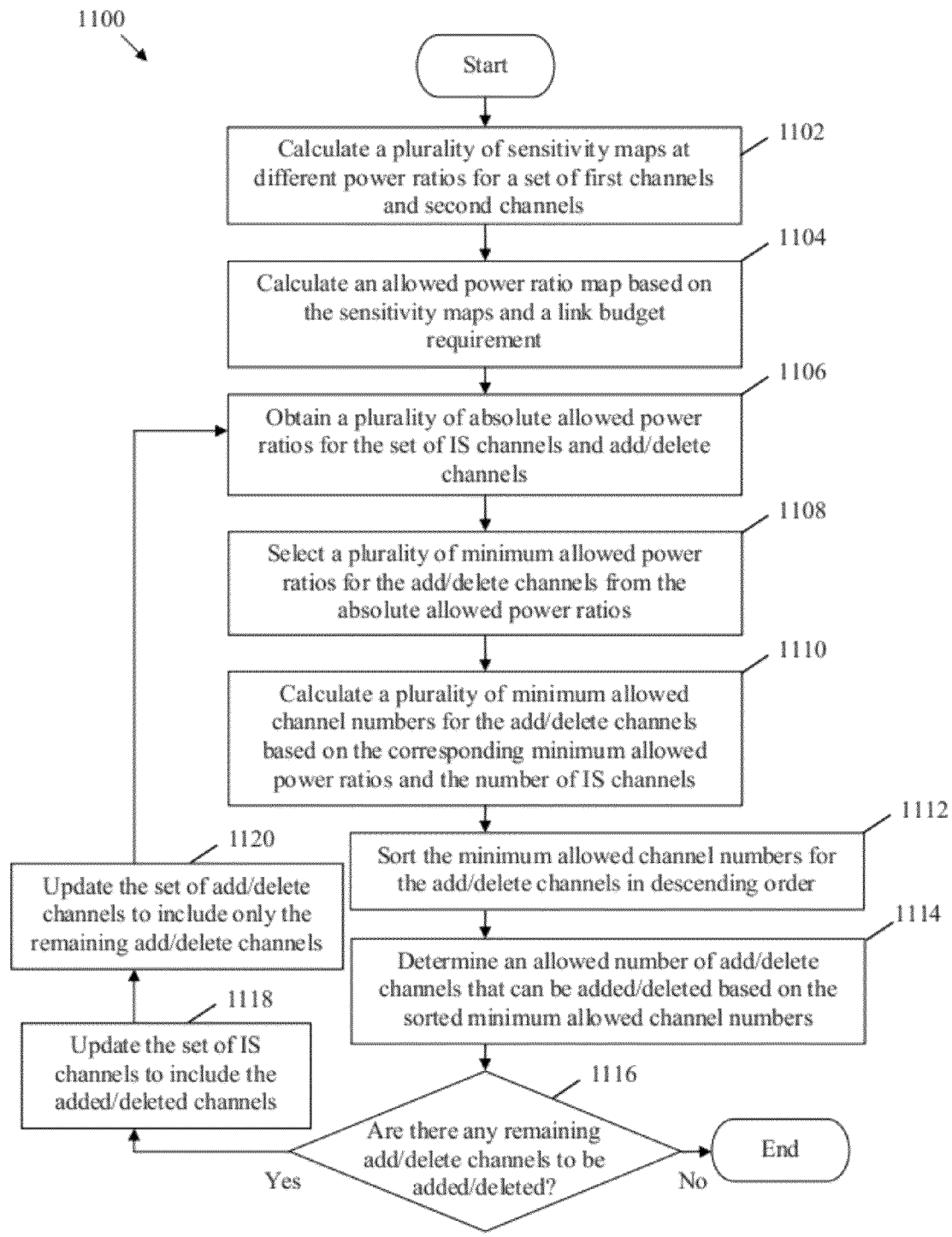
FIG. 11 is a flowchart of an embodiment of a channel adding/deleting method.

FIG. 11 illustrates an embodiment of channel adding/deleting method 1100, which may be used to efficiently and safely add/delete a plurality of add/delete channels to a plurality of IS channels. The method 1100 may efficiently select multiple add/delete channels that may be added/deleted in each step and may safely select the channels at each step within the link budget requirement, as described above. The method 1100 may begin at block 1102, where a plurality of sensitivity maps at different power ratios may be calculated for a set of first channels and second channels. Each of the sensitivity maps may be calculated at one of the power ratios of the second channels relative to the first channels. Each sensitivity map may provide a sensitivity measure in terms of gain change for each pair of first channel and second channel at a corresponding power ratio. At block 1104, an allowed power ratio map may be calculated based on the sensitivity maps and a link budget requirement. For each combination of first channel and second channel in the allowed power ratio map, an allowed power ratio may be selected from the corresponding values of the sensitivity maps that meet a link budget allowance.

At block 1106, a plurality of absolute allowed power ratios may be obtained for a set of IS channels and add/delete channels. The absolute values of the allowed power ratios that correspond to the pairs of IS channels and add/delete channels may be obtained from the allowed power ratio map. At block 1108, a plurality of minimum allowed power ratios may be selected for the add/delete channels from the absolute allowed power ratios. For each add/delete channel, the corresponding minimum allowed power ratio may be selected from all the obtained absolute allowed power ratios associated with all the IS channels. At block 1110, a plurality of minimum allowed channel numbers may be calculated for the add/delete channels based on the corresponding minimum allowed power ratios and the number of IS channels. For each add/delete channel, the minimum allowed channel number may be equal to the product of the corresponding minimum allowed power ratio and the number of IS channels.

At block 1112, the minimum allowed channel numbers for the add/delete channels may be sorted in descending order. At block 1114, an allowed number of add/delete channels that can be added/deleted may be determined based on the sorted minimum allowed channel numbers. The quantity of add/delete channels that can be added/deleted may be determined by checking each sorted minimum allowed channel number in descending order. If the minimum allowed channel number is greater than or about equal to the quantity of preceding add/delete channels that have higher minimum allowed channel numbers in addition to the current add/delete channel of the minimum allowed channel number under examination, then the preceding add/delete channels and the current add/delete channel may be added/deleted. If the minimum allowed channel number under examination is less than the quantity of preceding add/delete channels in addition to the current add/delete channel, then the current add/delete channel and the subsequent add/delete channels that have lower minimum allowed channel numbers may not be added/deleted. This selection scheme is described in the channel add scenario 900 and illustrated in the tables of FIG. 9. This selection scheme may maximize the number of selected add/delete channels at each step and select a subset of add/delete channels that is less sensitive and hence that cause less disturbance or gain change in the system.

At block 1116, the method 1100 may determine whether there are any remaining add/delete channels to be added/deleted. The method 1100 may proceed to block 1118 if there are remaining add/delete channels in the set of add/delete channels. Otherwise, the method 1100 may end. At block 1118, the set of IS channels may be updated to include the added/deleted channels. At block 1120, the set of add/delete channels may be updated to include only the remaining add/delete channels that still need to be added/deleted. The method 1100 may then return to block 1106 to obtain the absolute allowed power ratios for the updated set of IS channels and add/delete channels and repeat the selection scheme above to add/delete the remaining channels.

Figure 12:
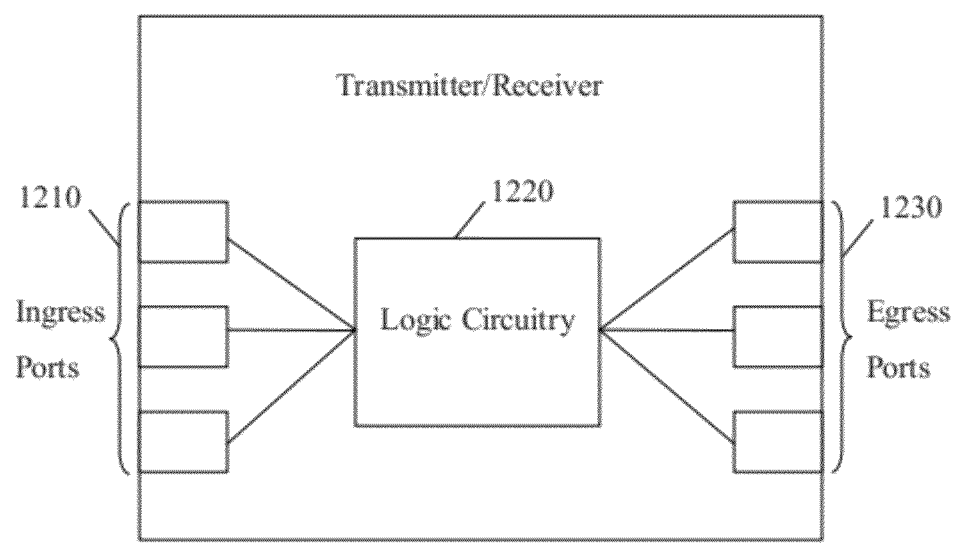
FIG. 12 is a schematic diagram of an embodiment of a network component unit.

FIG. 12 illustrates an embodiment of a transmitter/receiver unit 1200, which may be any device that transports packets through a network. For instance, the transmitter/receiver unit 1200 may be located at a family member device, a family gateway, a local family space, and/or a family space on cloud. The transmitted/receiver unit 1200 may comprise one or more ingress ports or units 1210 for receiving packets, objects, or TLVs from other network components, logic circuitry 1220 to determine which network components to send the packets to, and one or more egress ports or units 1230 for transmitting frames to the other network components.

Figure 13:
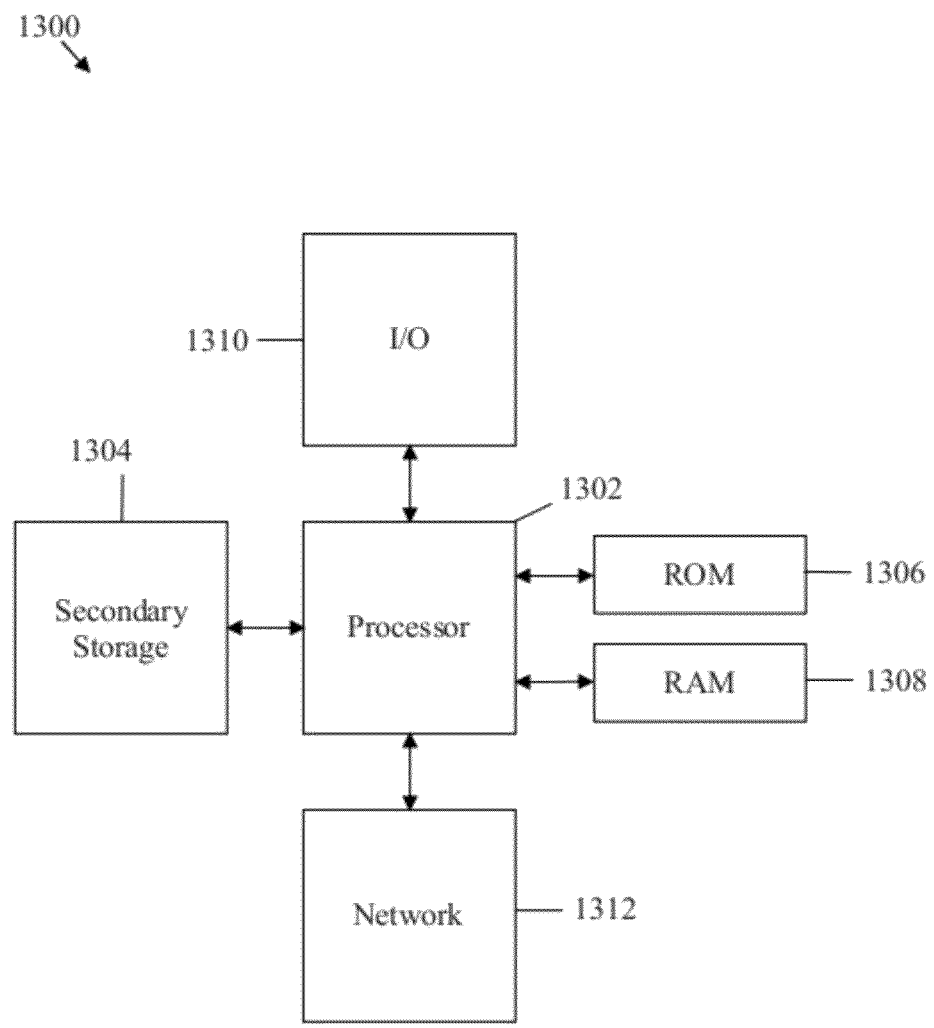
FIG. 13 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 13 illustrates a typical, general-purpose network component 1300 suitable for implementing one or more embodiments of the components disclosed herein. The network component 1300 includes a processor 1302 (which may be referred to as a central processor unit or CPU) that is in communication with memory devices including second storage 1304, read only memory (ROM) 1306, random access memory (RAM) 1308, input/output (I/O) devices 1310, and network connectivity devices 1312. The processor 1302 may be implemented as one or more CPU chips, or may be part of one or more application specific integrated circuits (ASICs).

The second storage 1304 is typically comprised of one or more disk drives or tape drives and is used for non-volatile storage of data and as an over-flow data storage device if RAM 1308 is not large enough to hold all working data. Second storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of second storage 1304. The RAM 1308 is used to store volatile data and perhaps to store instructions. Access to both ROM 1306 and RAM 1308 is typically faster than to second storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   one or more optical amplifiers coupled to an optical link and configured to amplify a plurality of Wavelength Division Multiplexing (WDM) channels that are transmitted at a plurality of wavelengths on the optical link; and
   a processor coupled to the optical link and configured to add, delete, or both a plurality of WDM channels in the optical link based on an allowed power ratio indication for the WDM channels,
   wherein the allowed power ratio indication is calculated based on a plurality of gain change representations for the WDM channels at a plurality of power ratios and on a pre-determined value of gain change caused by one of adding and deleting a channel for the optical link.

2. The apparatus of claim 1, wherein the allowed power ratio indication comprises an allowed power ratio map.

3. The apparatus of claim 2, wherein each of the gain change representations is a two dimensional matrix that indicates a gain change for each of a plurality of first channels caused by at least one of addition and deletion of a plurality of second channels, and wherein the power ratios of the gain change representations indicate the power of the second channels to the power of the first channels.

4. The apparatus of claim 3, wherein the allowed power ratio indication is calculated by obtaining the gain change representations for the WDM channels at various power ratios of the second channels to the first channels and finding a power ratio that causes a highest amount of gain change allowed by the link budget requirement for each of the first channels.

5. The apparatus of claim 3, wherein for each of the gain change representations, the second channels within a one of the gain change representations have about the same power ratio, and wherein the power ratios for different gain change representations are different.

6. The apparatus of claim 3, wherein the allowed power ratio indication is a two dimensional matrix that indicates a maximum allowed power ratio for each of the second channels based on a link budget allowance.

7. The apparatus of claim 6, wherein the link budget allocates a certain amount of Optical Signal-to-Noise Ratio (OSNR) margin for a channel add/delete, wherein the OSNR margin determines the allowed power change of any one of the first channels as a result of at least one of adding and deleting any one of the second channels.

8. The apparatus of claim 1, wherein each optical amplifier is configured to maintain an about constant average gain for the amplified WDM channels at the corresponding wavelengths.

9. The apparatus of claim 2, wherein the allowed power ratio map comprises one of a chart and a table.

10. A network component comprising:
    a transmitter configured to transmit a plurality of in-service (IS) wavelength channels on an optical link; and
    a processor configured to at least one of add and delete a plurality of channels on the optical link based on a plurality of gain change representations for a plurality of power ratios of the channels versus the IS channels to satisfy a link budget requirement.

11. The network component of claim 10, wherein the gain change representations are combined with the link budget requirement to calculate an allowed power ratio indication that indicates a plurality of maximum allowed power ratios of the channels with respect to the IS channels.

12. The network component of claim 11, wherein the maximum allowed power ratios in the allowed power ratio indication are examined to maximize the number of channels that are one of added and deleted per one step and wherein the channels are selected based on the maximum allowed power ratios in the allowed power ratio indication for safely adding or deleting with acceptable performance degradation within the link budget requirement.

13. The network component of claim 10, wherein each of the maximum allowed power ratios in the allowed power ratio indication is selected according to the relation:

$$\Delta G(P_{\lambda 1}, P_{\lambda 2}, \ldots, P_{\lambda m}), (P_{\lambda m+1}, P_{\lambda m+2}, \ldots, P_{\lambda m+n})) < \max\{\Delta G(mP_{\lambda \in (\lambda 1, \ldots, \lambda m)}, nP_{\lambda \in (\lambda m+1, \ldots, \lambda m+n)}\},$$

where $\Delta G((P_{\lambda 1}, P_{\lambda 2}, \ldots, P_{\lambda m}), (P_{\lambda m+1}, P_{\lambda m+2}, \ldots, P_{\lambda m+n}))$ is a gain change value at the IS channels $\lambda 1, \lambda 2, \ldots,$ and $\lambda m$, due to adding or deleting the channels $\lambda m+1, \lambda m+2, \ldots,$ and $\lambda m+n$, m is the number of IS channels, n is the number of channels, and $\max\{\Delta G(mP_{\lambda \in (\lambda 1, \ldots, \lambda m)}, nP_{\lambda \in (\lambda m+1, \ldots \lambda m+n)}\}$ is the maximum among each of the gain change values for each one of the IS channels $\lambda 1, \lambda 2, \ldots,$ and $\lambda m$ multiplied by m due to adding or deleting a multiple of n of each of the channels $\lambda m+1, \lambda m+2, \ldots,$ and $\lambda m+n$.

14. The network component of claim 10, wherein the gain change representations are obtained for a plurality of different Erbium Doped Fiber Amplifiers (EDFAs) that have different gains and are configured to amplify the IS channels on the optical link, and wherein each of the gain change representations at each of the power ratios is a worst case gain change representation among the different EDFAs.

15. The network component of claim 10, wherein the gain change representations are obtained for a plurality of different Erbium Doped Fiber Amplifiers (EDFAs) that have different gains and are configured to amplify the IS channels on the optical link, and wherein a gain change representation for each of the different EDFAs is used at each of the power ratios.

16. A data processing implemented method comprising:
   calculating with a processor a plurality of gain change representations at different power ratios for a set of first channels and second channels;
   calculating with a processor an allowed power ratio indication based on the gain change representations and a link budget requirement; and
   determining with a processor an allowed number of channels that can be added or deleted to an optical communication system based on the allowed power ratio indication.

17. The data processing implemented method of claim 16 further comprising:
   obtaining from the allowed power ratio indication a plurality of absolute allowed power ratios for a set of in-service (IS) channels and add/delete channels; and
   selecting a plurality of minimum allowed power ratios for the add/delete channels from the absolute allowed power ratios.

18. The data processing implemented method of claim 17 further comprising:
   calculating a plurality of minimum allowed channel numbers for the add/delete channels based on the corresponding minimum allowed power ratios and the number of IS channels; and
   sorting the minimum allowed channel numbers for the add/delete channels in descending order.

19. The data processing implemented method of claim 18 further comprising determining an allowed number of add/delete channels than can be added or deleted per one step based on the sorted minimum allowed channel numbers, wherein the allowed number of add/delete channels than can be added or deleted per one step is a maximum number of channels that is smaller than a corresponding sorted minimum allowed channel number.

20. The data processing implemented method of claim 19 further comprising:
   updating the set of IS channels to include the added or deleted channels; and
   updating the set of add/delete channels to only include any remaining add/delete channels that are not added or deleted.

* * * * *